United States Patent
Morita et al.

(10) Patent No.: US 7,576,801 B2
(45) Date of Patent: Aug. 18, 2009

(54) SIGNAL PROCESSING APPARATUS, METHOD OF SAME, AND PROGRAM OF SAME

(75) Inventors: Hideo Morita, Kanagawa (JP); Satoshi Tanaka, Kanagawa (JP)

(73) Assignee: Sony Corporation (JP)

( * ) Notice: Subject to any disclaimer, the term of this patent is extended or adjusted under 35 U.S.C. 154(b) by 532 days.

(21) Appl. No.: 10/515,406

(22) PCT Filed: May 23, 2003

(86) PCT No.: PCT/JP03/06445

§ 371 (c)(1),
(2), (4) Date: Jun. 13, 2005

(87) PCT Pub. No.: WO03/101099

PCT Pub. Date: Dec. 4, 2003

(65) Prior Publication Data

US 2005/0243214 A1    Nov. 3, 2005

(30) Foreign Application Priority Data

May 23, 2002   (JP) ............................... 2002-149068

(51) Int. Cl.
*H04N 13/00*    (2006.01)
*H04N 5/14*     (2006.01)
(52) U.S. Cl. .................. 348/441; 348/701; 348/448
(58) Field of Classification Search ............... 348/558, 348/700, 701, 441, 459, 97, 448, 452, 715, 348/901, 607

See application file for complete search history.

(56) References Cited

U.S. PATENT DOCUMENTS

| | | | | |
|---|---|---|---|---|
| 4,307,420 A | * | 12/1981 | Ninomiya et al. | 375/240.14 |
| 4,982,280 A | | 1/1991 | Lyon et al. | |
| 5,365,273 A | * | 11/1994 | Correa et al. | 348/452 |
| 5,563,651 A | * | 10/1996 | Christopher et al. | 348/97 |
| 5,689,301 A | * | 11/1997 | Christopher et al. | 348/97 |
| 5,734,435 A | * | 3/1998 | Wilson et al. | 348/459 |
| 5,808,664 A | * | 9/1998 | Yamashita et al. | 348/42 |
| 5,828,786 A | * | 10/1998 | Rao et al. | 382/236 |
| 5,864,368 A | | 1/1999 | Kato et al. | |
| 5,892,550 A | | 4/1999 | Iwasaki et al. | |
| 6,154,257 A | | 11/2000 | Honda et al. | |
| 6,201,577 B1 | * | 3/2001 | Swartz | 348/558 |

(Continued)

FOREIGN PATENT DOCUMENTS

JP    8-163555 A    6/1996

(Continued)

*Primary Examiner*—Victor R Kostak
(74) *Attorney, Agent, or Firm*—Lerner, David, Littenberg, Krumholz & Mentlik, LLP

(57) ABSTRACT

An apparatus including a one-field delay circuit 21 for delaying a luminance signal F0 of a video signal under judgment by an amount of one field; a subtractor circuit 22 for generating a difference signal FD0 indicating the difference between a luminance signal F1 and the luminance signal F0 for each field; an adder circuit 23; a one-field delay circuit 24; a one-field delay circuit 25 for delaying the difference signal FD0 by an amount of one field; and a comparison circuit 26 and a judgment circuit 27 for comparing the difference signals FD0 and FD1 and deciding if the luminance signal FD0 is a film video signal based on the result of the comparison.

8 Claims, 11 Drawing Sheets

U.S. PATENT DOCUMENTS

| | | |
|---|---|---|
| 6,282,245 B1 * | 8/2001 | Oishi et al. ............ 375/240.28 |
| 6,297,848 B1 * | 10/2001 | Westerman ................ 348/448 |
| 6,348,926 B1 * | 2/2002 | Nozawa et al. ............. 345/603 |
| 6,480,232 B1 * | 11/2002 | Wilson et al. .............. 348/459 |
| 6,509,933 B1 * | 1/2003 | Honda ....................... 348/558 |
| 7,034,889 B2 * | 4/2006 | Burchard et al. ........... 348/459 |
| 2003/0098924 A1 * | 5/2003 | Adams et al. .............. 348/448 |
| 2004/0252757 A1 * | 12/2004 | Morita ................. 375/240.01 |

FOREIGN PATENT DOCUMENTS

| JP | 9-55879 A | 2/1997 |
|---|---|---|
| JP | 9-154136 A | 6/1997 |
| JP | 11-261972 A | 9/1999 |
| JP | 2001-169252 A | 6/2001 |

* cited by examiner

FIG. 11

24 frame/sec 3-2 Pull Down

| Field | | O | E | O | O | E | O | E | O | O | E | O | E | O | O | E | O | E |
|---|---|---|---|---|---|---|---|---|---|---|---|---|---|---|---|---|---|---|
| F0 | Y IN | Ao | Ae | Bo | Be | Bo | Ce | Co | De | Do | De | Eo | Ee | Fo | Fe | Fo | Ge | Go | He | Ho | He |
| F1 | Y 1 Field Delay | | Ao | Ae | Bo | Be | Bo | Ce | Co | De | Do | De | Eo | Ee | Fo | Fe | Fo | Ge | Go | He | Ho |
| F2 | Y 2 Field Delay | | | Ao | Ae | Bo | Be | Bo | Ce | Co | De | Do | De | Eo | Ee | Fo | Fe | Fo | Ge | Go | He |
| F0-F1 | Field Difference | | 0 | 1 | 0 | 0 | 1 | 0 | 1 | 0 | 0 | 1 | 0 | 1 | 0 | 0 | 1 | 0 | 1 | 0 | 0 |
| F0-F2 | Frame Difference | | | 1 | 0 | 1 | 1 | 1 | 0 | 1 | 1 | 1 | 0 | 1 | 1 | 1 | 0 | 1 | 1 | 1 | 0 | 1 |

SIGNAL PROCESSING APPARATUS, METHOD OF SAME, AND PROGRAM OF SAME

TECHNICAL FIELD

The present invention relates to a signal processing apparatus and method and a program, more particularly relates to a signal processing apparatus capable of judging a format of a signal by a simple configuration, a method of the same, and a program of the same.

BACKGROUND ART

In order to view a video signal in a state with little flicker, recently the practice of converting a video signal of the interlace method to a video signal of the progressive method has become prevalent.

A video signal of the NTSC (National Television System Committee) method is comprised of 60 fields (30 frames) per second. As opposed to this, in a signal obtained from a movie film, the number of frames per second is made 24 frames. Accordingly, when converting an image of a movie to a video signal of the NTSC method, the conversion processing is carried out by the 3-2 pull-down method. When this conversion processing is carried out, images of the same frame are arranged in two continuous fields, and the same images of the next frame are arranged in the following three continuous fields. As a result, images of 24 frames can be assigned to 60 fields.

In this way, in a 3-2 pull-down converted film video signal, the video signals of the first field and the third field among three continuous fields become exactly the same video signals. When converting a video signal of the interlace method to a video signal of the progressive method, if the same video signal has been already encoded, the processing of the video signal appearing second can be omitted. Accordingly, when it is known in advance whether or not the video signal is a film video signal, more efficient encoding becomes possible.

Therefore, a method of judging whether or not a video signal is a 3-2 pull-down converted film video signal is disclosed in for example U.S. Pat. No. 4,982,280.

FIG. 11 shows the principle of the method proposed in this U.S. Patent. As shown in the figure, a video signal consists of a signal in which odd (O) and even (E) fields alternately appear. In the case of a 3-2 pull-down converted video signal, the image (luminance signal) of the first frame A is defined as the video signal of two fields of an odd field Ao and an even field Ae.

The image of the next frame B is arranged in three fields of an odd field, an even field, and a next odd field. Namely, the first field is defined as the odd field Bo, the next field is defined as the even field Be, and the third field is defined as the odd field Bo. Accordingly, among three fields, the first odd field Bo and the third odd field Bo become exactly the same signal.

Below, video signals of frames of a film such as a frame C, a frame D, a frame E, and a frame F are assigned to fields of the video signals in the same way as above.

When now assuming that an original signal which is not delayed among the luminance signals is F0, this original signal F0 is delayed by the amount of one field to obtain a signal F1. This signal F1 is further delayed by the amount of one field to obtain a signal F2.

Looking at the value of the frame reference obtained by subtracting the signal F2 from the signal F0, as shown in FIG. 11, the values of the signals F0 and F2 become the same at Bo, De, Fo, He, ... at least one time in each cycle consisting of five fields. As a result, the value of F0-F2 becomes 1101111011110 . . . . Namely, defining five fields as the period, the value becomes 0 at least one time in each cycle.

Contrary to this, in the case of a video signal of the ordinary NTSC method not a 3-2 pull-down converted video signal, the frame reference becomes 11111111 . . . .

Accordingly, it can be judged whether or not a video signal is a film video signal from the difference of patterns of the frame differences.

When judging if a signal is a film video signal, however, it is necessary to provide two one-field delay circuits of the one-field delay circuit for generating the signal F1 and the one-field delay circuit for generating the signal F2, so the apparatus becomes large in scale. The same problem occurs also in a case of detecting a detected signal comprised of a plurality of module signals where there is a pattern of two coinciding module signals located on two sides sandwiching a predetermined module signal at a predetermined position in a predetermined number of continuous module signals.

DISCLOSURE OF THE INVENTION

The present invention was made in consideration with such a circumstance and has as an object thereof to provide a signal processing apparatus capable of being reduced in scale when detecting a video signal in which there is a pattern of two coinciding fields located on two sides sandwiching a predetermined field at a predetermined position in a predetermined number of continuous fields, a method of the same, and a program of the same.

Further, the present invention has as its object to provide a signal processing apparatus capable of being reduced in scale when detecting a detected signal comprised of a plurality of module signals wherein there is a pattern of two coinciding module signals located on two sides sandwiching a predetermined module signal at a predetermined position in a predetermined number of continuous module signals To attain the above object, according to a first aspect of the invention, there is provided a signal processing apparatus comprising a first delaying means for delaying a luminance signal by an amount of one field; a processing means for generating a difference signal indicating a difference between the luminance signal delayed by an amount of one field by the first delaying means and a not delayed luminance signal for each field; a second delaying means for delaying the difference signal generated by the processing means by an amount of one field; and a judging means for comparing the difference signal generated by the processing means and the difference signal delayed by an amount of one field by the second delaying means and judging the format of the luminance signal based on the result of the comparison.

The mode of operation of the signal processing apparatus of the first aspect of the invention is as follows.

The first delaying means delays a luminance signal by an amount of one field.

Then, the processing means generates a difference signal indicating the difference between the luminance signal delayed by an amount of one field by the first delaying means and a not delayed luminance signal for each field.

Then, the second delaying means delays the difference signal generated by the processing means by an amount of one field.

Then, the judging means compares the difference signal generated by the processing means and the difference signal delayed by an amount of one field by the second delaying means and judges the format of the luminance signal based on the result of the comparison.

In the signal processing apparatus of the first aspect of the invention, preferably, the processing means finds the difference in units of pixel data in each field and generates the difference signal defining the value obtained by cumulatively adding one-field amounts of the differences as the difference of the fields.

Further, in the signal processing apparatus of the first aspect of the invention, preferably the judging means judges that the luminance signal is a film video signal when the difference signal generated by the processing means and the difference signal delayed by an amount of one field by the second delaying means coincide at an interval corresponding to the time of a predetermined number of fields based on the result of the comparison.

Further, in the signal processing apparatus of the first aspect of the invention, preferably the film video signal is a film video signal in which there is a pattern of coinciding luminance signals of two fields located at two sides sandwiching a luminance signal of a predetermined field at a predetermined position in a predetermined number of continuous fields.

Further, in the signal processing apparatus of the first aspect of the invention, preferably the apparatus is further provided with a third delaying means for delaying the luminance signal delayed by an amount of one field by the first delaying means further by the amount of one field and a signal generating means for generating a progressive signal by combining line signals in the not delayed luminance signal, the luminance signal delayed by the first delaying means, and the luminance signal delayed by the third delaying means based on the result of judgment of the judging means.

According to a second aspect of the invention, there is provided a signal processing method comprising a first step of delaying a luminance signal by an amount of one field; a second step of generating a difference signal indicating the difference between the luminance signal delayed by an amount of one field at the first step and a not delayed luminance signal for each field; a third step of delaying the difference signal generated at the second step by an amount of one field; and a fourth step of comparing the difference signal generated at the second step and the difference signal delayed by an amount of one field at the third step and judging the format of the luminance signal based on the result of the comparison.

According to a third aspect of the invention, there is provided a program executed by a signal processing apparatus, comprising a first routine of delaying a luminance signal by an amount of one field; a second routine of generating a difference signal indicating the difference between the luminance signal delayed by an amount of one field in the first routine and a not delayed luminance signal for each field; a third routine of delaying the difference signal generated in the second routine by an amount of one field; and a fourth routine of comparing the difference signal generated in the second routine and the difference signal delayed by an amount of one field in the third routine and judging the format of the luminance signal based on the result of the comparison.

According to a fourth aspect of the invention, there is provided a signal processing apparatus for detecting a detected signal comprised of a plurality of module signals wherein there is a pattern of two coinciding module signals located at two sides sandwiching a predetermined module signal at a predetermined position in a predetermined number of continuous module signals, comprising a first delaying means for delaying a signal under detection by an amount of one module signal; a processing means for generating a difference signal indicating the difference between the signal under detection delayed by an amount of one module signal by the delaying means and a not delayed signal under detection in units of the module signal; a second delaying means for delaying the difference signal generated by the processing means by an amount of one module signal; and a detecting means for comparing the difference signal generated by said processing means and said difference signal delayed by an amount of one module signal by said second delaying means and detecting whether or not said signal under detection is said detected signal based on the result of the comparison.

The mode of operation of the signal processing apparatus of the fourth aspect of the invention is as follows.

The first delaying means delays a signal under detection by an amount of one module signal.

Then, the processing means generates a difference signal indicating the difference between the signal under detection delayed by an amount of one module signal by the first delaying means and a not delayed signal under detection in units of the module signal.

Then, the second delaying means delays the difference signal generated by the processing means by an amount of one module signal.

Then, the detecting means compares the difference signal generated by the processing means and the difference signal delayed by an amount of one module signal by the second delaying means and detects whether or not the signal under detection is the detected signal based on the result of the comparison.

According to a fifth aspect of the invention, there is provided a signal processing method for detecting a detected signal comprised of a plurality of module signals wherein there is a pattern of two coinciding module signals located at two sides sandwiching a predetermined module signal at a predetermined position in a predetermined number of continuous module signals, comprising a first step of delaying a signal under detection by an amount of one module signal; a second step of generating a difference signal indicating the difference between the signal under detection delayed by an amount of one module signal at the first step and a not delayed signal under detection in units of the module signal; a third step of delaying the difference signal generated at the second step by an amount of one module; and a fourth step of comparing the difference signal generated at the second step and the difference signal delayed by an amount of one module signal at the third step and detecting whether or not the signal under detection is the detected signal based on the result of the comparison.

According to a sixth aspect of the invention, there is provided a program, executed by a signal processing apparatus, for detecting a detected signal comprised of a plurality of module signals wherein there is a pattern of two coinciding module signals located on two sides sandwiching a predetermined module signal at a predetermined position in a predetermined number of continuous module signals, comprising a first routine of delaying a signal under detection by an amount of one module signal; a second routine of generating a difference signal indicating the difference between the signal under detection delayed by an amount of one module signal in the first routine and the not delayed signal under detection in units of the module signal; a third routine of delaying the difference signal generated in the second routine an amount of one module; and a fourth routine of comparing the difference signal generated in the second routine and the difference signal delayed by an amount of one module signal in the third routine and detecting whether or not the signal under detection is the detected signal based on the result of the comparison.

BRIEF DESCRIPTION OF THE DRAWINGS

FIG. 11 is a view for explaining the prior art.

BEST MODE FOR WORKING THE INVENTION

Below, an explanation will be given of signal processing apparatuses according to embodiments of the present invention.

First Embodiment

Figure 1:
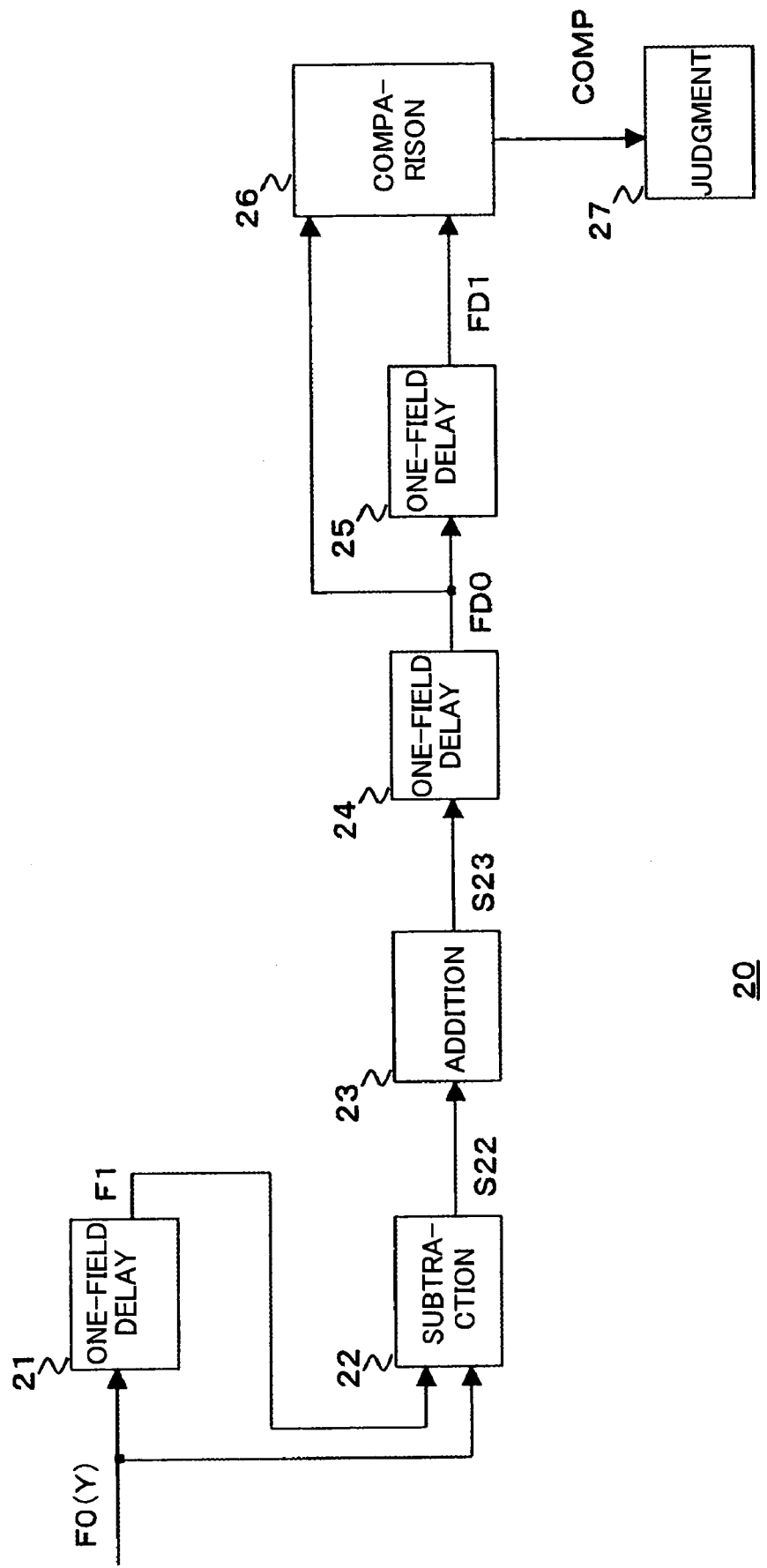
FIG. 1 is a functional block diagram of a signal processing apparatus of a first embodiment of the present invention.

FIG. 1 is a functional block diagram of a signal processing apparatus 20 of the present embodiment.

As shown in FIG. 1, the signal processing apparatus 20 has for example a one-field delay circuit 21, a subtractor circuit 22, an adder circuit 23, one-field delay circuits 24 and 25, a comparison circuit 26, and a judgment circuit 27.

Here, the one-field delay circuit 21 corresponds to the first delaying means of the present invention, the subtractor circuit 22 and the adder circuit 23 correspond to the processing means of the present invention, the one-field delay circuit 25 corresponds to the second delaying means of the present invention, and the subtractor circuit 22 and the judgment circuit 27 correspond to the judging means or the detecting means of the present invention.

FIGS. 2A to 2E are views for explaining signals shown in FIG. 1 in a case where a luminance signal F0(Y) of a 3-2 pull-down converted film video signal explained before by using FIG. 11 is input to the signal processing apparatus 20.

As shown in FIGS. 2A to 2E, in the luminance signal of the film video signal, when viewing continuous luminance signals of five fields (for example, Ao, Ae, Bo, Be, Bo), there are luminance signals Bo and Bo of two fields located at two sides sandwiching a luminance signal of the second field. Further, in the luminance signal F0, there is this coinciding pattern at the same position in the five continuous fields.

Note that the signal of each field corresponds to the module signal of the fourth aspect of the invention.

Accordingly, in the difference signal F0 indicating the difference between the luminance signal F1 obtained by delaying the luminance signal FD0 by one field and the luminance signal F0, d2 indicating the difference between the third Be and the fourth Bo, and d3 indicating the difference between the fourth Bo and the fifth Be coincide (become the same). In the signal processing apparatus 20 of the present embodiment, it is judged whether or not the input luminance signal is a film video signal by detecting the coincidence.

This film video signal is a signal obtained by converting for example a film material of 24 frames/second to a 60 Hz interlace signal by the 3-2 pull-down processing.

Below, an explanation will be given of components of the signal processing apparatus 20 by referring to FIG. 1 and FIGS. 2A to 2E.

Figure 2:
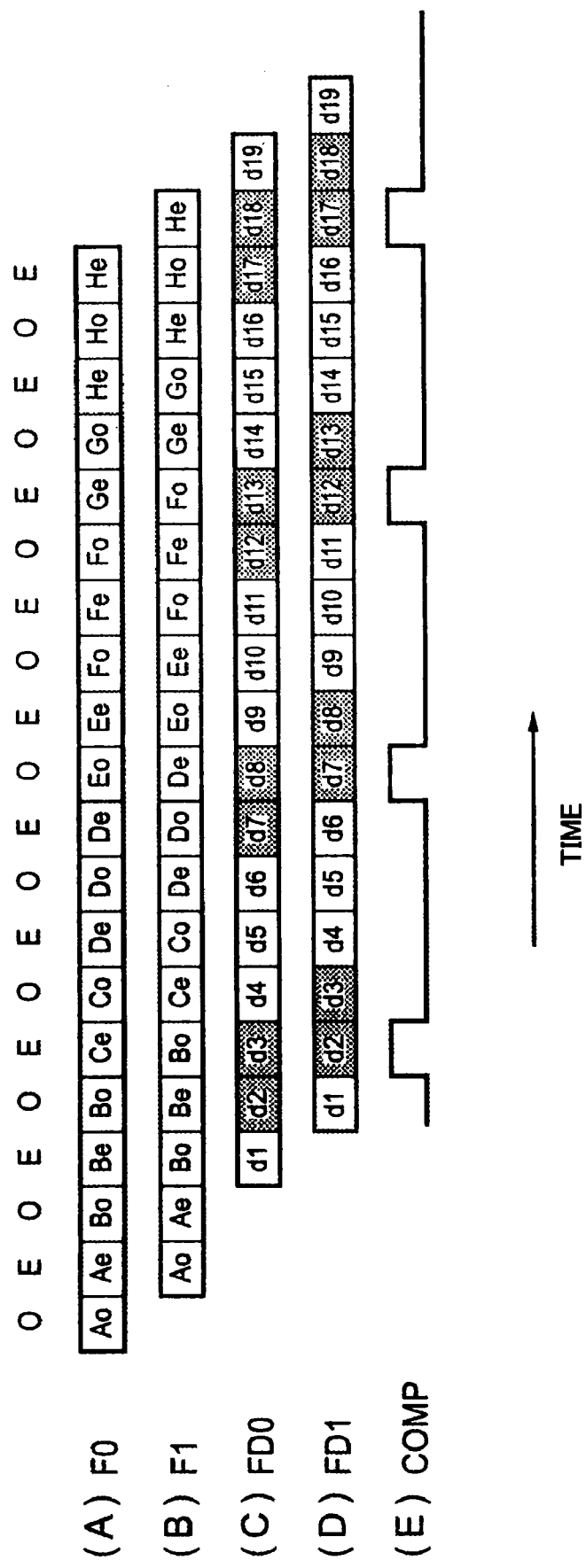
FIGS. 2A to 2E are views for explaining signals shown in FIG. 1 in a case where a luminance signal F0(Y) of a 3-2 pull-down converted film video signal is input to the signal processing apparatus shown in FIG. 1.

The one-field delay circuit 21 outputs the luminance signal F1, obtained by delaying the input luminance signal F0(Y) shown in FIG. 2A by an amount of one field, to the subtractor circuit 22.

The subtractor circuit 22 generates a difference signal S22 indicating a value obtained by finding the difference between the not delayed luminance signal F0 and the luminance signal F1 shown in FIG. 2B delayed by an amount of one field input from the one-field delay circuit 21 in units of the pixel data in each field and outputs this to the adder circuit 23.

The adder circuit 23 generates a difference signal S23 indicating a value obtained by cumulatively adding the differences indicated by the difference signal S22 from the subtractor circuit 22 for each field and outputs this to the delay circuit 24.

The one-field delay circuit 24 outputs the difference signal FD0 shown in FIG. 2C obtained by delaying the difference signal S23 input from the adder circuit 23 by an amount of for example one field to the one-field delay circuit 25 and the comparison circuit 26.

The one-field delay circuit 25 outputs the difference signal FD1 shown in FIG. 2D, obtained by delaying the difference signal FD0 input from the one-field delay circuit 24 by an amount of one field, to the comparison circuit 26.

The comparison circuit 26 compares the difference signals FD0 and FD1 in units corresponding to each field, generates a comparison result signal COMP shown in FIG. 2E indicating a logical value "1" (first logical value) at a timing when they coincide and indicating a logical value "0" (second logical value) at a timing when they do not coincide; and outputs this to the judgment circuit 27.

Specifically, the comparison circuit 26 computes the difference between the difference signals FD0 and FD1 in units corresponding to each field, decides whether or not the difference is larger than a predetermined reference value, makes the value of the comparison result signal COMP in a corresponding field period the logical value "0" when deciding that the difference is larger, and makes the value of the comparison result signal COMP in the corresponding field period the logical value "1" when deciding that the difference is smaller.

At this time, when the luminance signal F0 is a luminance signal of a film video signal, the comparison result signal COMP periodically generates a pulse of the logical value "1" one time per five fields by the format of the film video signal explained by using FIG. 11.

Note that when the luminance signal F0 is a signal after A/D conversion etc., there is a case where the signals of different fields obtained from the same material in the luminance signal F0 will not completely coincide due to the influence of noise etc., therefore the decision of coincidence/non-coincidence by the comparison circuit 26 is carried out considering this.

The judgment circuit 27 judges whether or not the video signal corresponding to the luminance signal F0 is a film video signal and the sequence thereof based on the comparison result signal COMP from the comparison circuit 26.

Specifically, the judgment circuit 27 judges that the luminance signal F0 is a luminance signal of a film video signal when deciding that the comparison result signal COMP periodically generates a pulse of the logical value "1" one time in five fields.

Below, an explanation will be given of an example of the operation of the signal processing apparatus 20 shown in FIG. 1.

Figure 3:
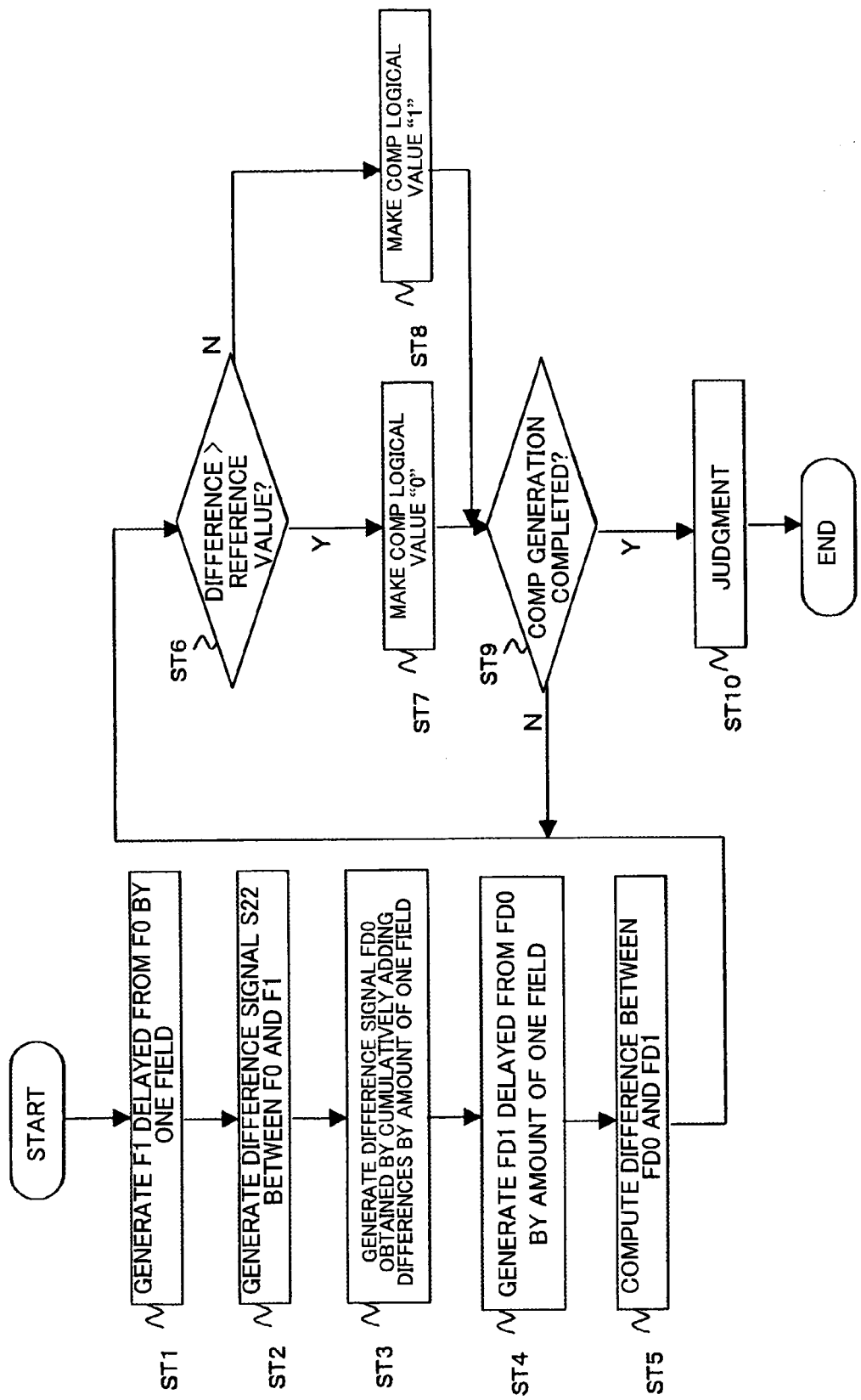
FIG. 3 is a flow chart for explaining an example of the operation of the signal processing apparatus shown in FIG. 1.

FIG. 3 is a flow chart for explaining the example of operation.

Step ST1:

The one-field delay circuit 21 outputs a luminance signal F1, obtained by delaying the input luminance signal F0(Y) shown in FIG. 2A by an amount of one field, to the subtractor circuit 22.

Step ST2:

The subtractor circuit 22 generates a difference signal S22 indicating a value obtained by finding the difference between the not delayed luminance signal F0 and the luminance signal F1 shown in FIG. 2B delayed by an amount of one field input from the one-field delay circuit 21 in units of the pixel data in each field and outputs this to the adder circuit 23.

Step ST3:

The adder circuit 23 generates a difference signal S23 indicating a value obtained by cumulatively adding the differences indicated by the difference signal S22 from the subtractor circuit 22 for each field and outputs this to the one-field delay circuit 24.

Then, the one-field delay circuit 24 outputs the difference signal FD0 shown in FIG. 2C, obtained by delaying the difference signal S23 input from the adder circuit 23 by an amount of one field, to the one-field delay circuit 25 and the comparison circuit 26.

Step ST4:

The one-field delay circuit 25 outputs the difference signal FD1 shown in FIG. 2D obtained by delaying the difference signal FD0 input from the one-field delay circuit 24 by an amount of one field to the comparison circuit 26.

Step ST5:

The comparison circuit 26 computes the difference between the difference signals FD0 and FD1 in units corresponding to each field.

Step ST6:

The comparison circuit 26 decides whether or not the difference computed at step ST5 is larger than a predetermined reference value, proceeds to the processing of step ST7 when deciding that the difference signal is larger, and proceeds to the processing of step ST8 when not deciding so.

Step ST7:

The comparison circuit 26 makes the value of the comparison result signal COMP in the corresponding field period the logical value "0".

Step ST8:

The comparison circuit 26 makes the value of the comparison result signal COMP in the corresponding field period the logical value "1".

Step ST9:

The comparison circuit compares whether or not the generation of the comparison result signal COMP is completed, proceeds to the processing of step ST10 when deciding that the generation is completed, and returns to the processing of step ST6 when the generation is not completed.

Step ST10:

The judgment circuit 27 judges whether or not the video signal corresponding to the luminance signal F0 is a film video signal and the sequence thereof based on the comparison result signal COMP from the comparison circuit 26. Specifically, the judgment circuit 27 judges that the luminance signal F0 is a luminance signal of a film video signal when deciding that the comparison result signal COMP periodically generates the pulse of the logical value "1" one time in five fields.

As explained above, according to the signal processing apparatus 20, as in the conventional case explained by using FIG. 11, it is not necessary to provide the delay circuit for delaying the luminance signal F0 by the amount of two fields in addition to the delay circuit for delaying the luminance signal F0 by the amount of one field, therefore a reduction of size can be achieved.

Note that, in the above embodiment, the case where the processing shown in FIG. 3 was carried out by using the hardware shown in FIG. 1 was exemplified, but it is also possible to perform the processing explained by using FIG. 3 by executing the program describing routines shown in FIG. 3 by a CPU.

Second Embodiment

Below, an explanation will be given of a case where the signal processing apparatus 20 of the first embodiment is used for a DVD (digital versatile disk) player.

Figure 4:
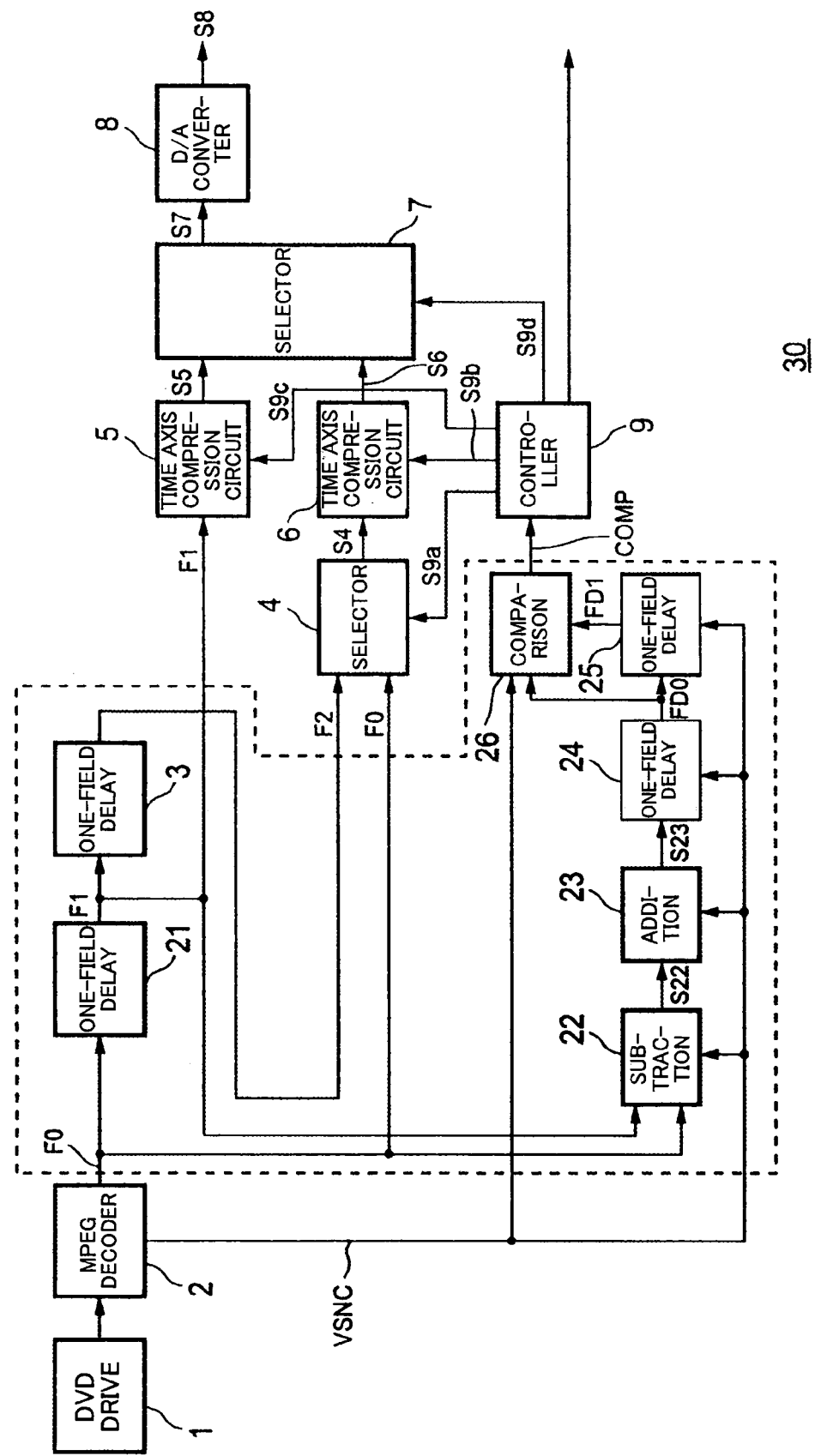
FIG. 4 is a functional block diagram of a DVD player according to a second embodiment of the present invention.

FIG. 4 is a functional block diagram of a DVD player 30 of the present embodiment.

As shown in FIG. 4, the DVD player 30 has for example a DVD drive 1, an MPEG decoder (Moving Picture Expert Group) 2, a one-field delay circuit 3, a selector circuit 4, a time axis compression circuit 5, a time axis compression circuit 6, a selector circuit 7, a D/A conversion circuit 8, a controller 9, a one-field delay circuit 21, a subtractor circuit 22, an adder circuit 23, a one-field delay circuit 24, a one-field delay circuit 25, and a comparison circuit 26.

In FIG. 4, the one-field delay circuit 21, the subtractor circuit 22, the adder circuit 23, the one-field delay circuit 24, the one-field delay circuit 25, and the comparison circuit 26 given the same notations as those of FIG. 1 are the same as those explained in the first embodiment.

The DVD drive 1 outputs the video signal reproduced from the DVD to the MPEG decoder 2.

The MPEG decoder 2 decodes the video signal input from the DVD drive 1, outputs the luminance signal F0(Y) of the video signal obtained by the decoding to the one-field delay circuit 21, and outputs a vertical synchronization signal VSNC to the subtractor circuit 22, the adder circuit 23, the one-field delay circuit 24, the one-field delay circuit 25, and the comparison circuit 26.

Figure 5:
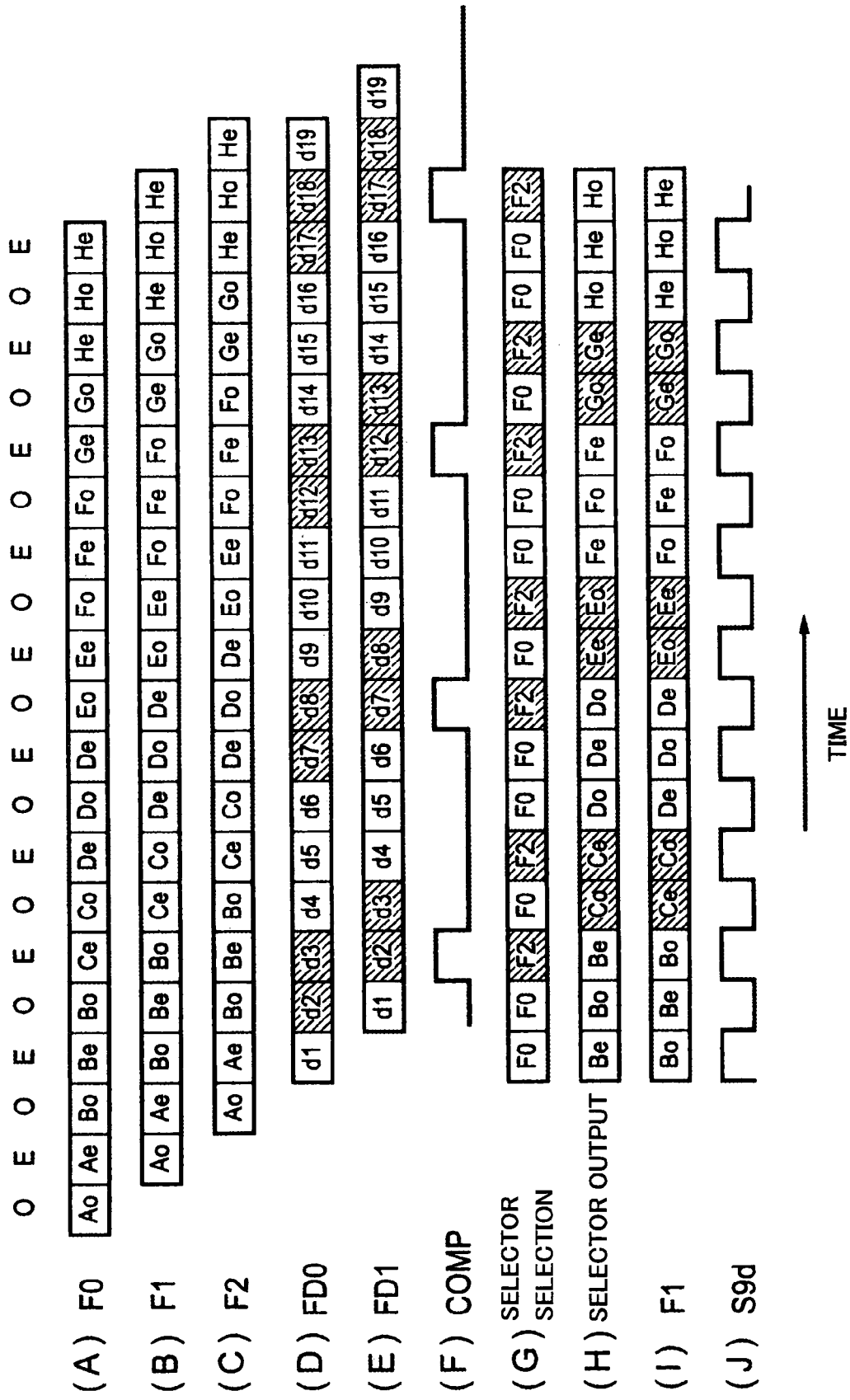
FIGS. 5A to 5J are views for explaining signals of the DVD player shown in FIG. 4.

The one-field delay circuit 21 outputs the luminance signal F1, obtained by delaying the luminance signal F0(Y) shown in FIG. 5A input from the MPEG decoder 2 by an amount of one field, to the subtractor circuit 22, the one-field delay circuit 3, and the time axis compression circuit 5.

The one-field delay circuit 3 outputs the luminance signal F2, obtained by further delaying the luminance signal F1 input from the one field delay circuit 21 by an amount of one field, to the selector circuit 4.

The subtractor circuit 22, the adder circuit 23, the one-field delay circuit 24, the one-field delay circuit 25, and the comparison circuit 26 operate by using the vertical synchronization signal VSNC from the MPEG decoder 2 as a reference. The operation content is the same as that explained in the first embodiment. Note that the comparison circuit 26 outputs the comparison result signal COMP shown in FIG. 5F to the controller 9.

The selector circuit 4 outputs a signal S4 shown in FIG. 5H, selected as shown in FIG. 5G by a selection signal S9a from the controller 9 between the signal of the field in the not delayed luminance signal F0 input from the MPEG decoder 2 and the signal of the field in the luminance signal F2 delayed by 2 fields input from the one-field delay circuit 3, to the time axis compression circuit 6.

As shown in FIG. 5G, the selector circuit 4 repeats the signal selection by the pattern of F2, F0, F2, F0, and F0 for five continuous fields.

The time axis compression circuit 5 outputs a signal S5 obtained by compressing the luminance signal F1 delayed by one field input from the one-field delay circuit 21 in time axis for each line signal based on the control signal S9c from the controller 9 to the selector circuit 7.

The selector circuit 7 generates a progressive signal S7 comprised of signals of lines selected based on a selection signal S9d shown in FIG. 5J from the controller 9 between a signal S5 and a signal S6 and outputs this to the D/A conversion circuit 8.

The selector circuit 7 performs the selection operation of the line signal during the period where for example the selection signal S9d shown in FIG. 5J indicates the logical value "1".

The D/A conversion circuit 8 converts the digital progressive signal S7 to an analog progressive signal S8 and outputs it.

FIG. 6 to FIG. 9 are views for explaining timings of the input of the line signal in the field of the luminance signal F1, the output of the line signal in the signal S5, the input of the line signal in the field of the signal S4, and the output of the line signal in the signal S6 in the time axis compression circuit 5 and the time axis compression circuit 6, and the progressive signal S7 generated by the selector circuit 7.

Figure 6:
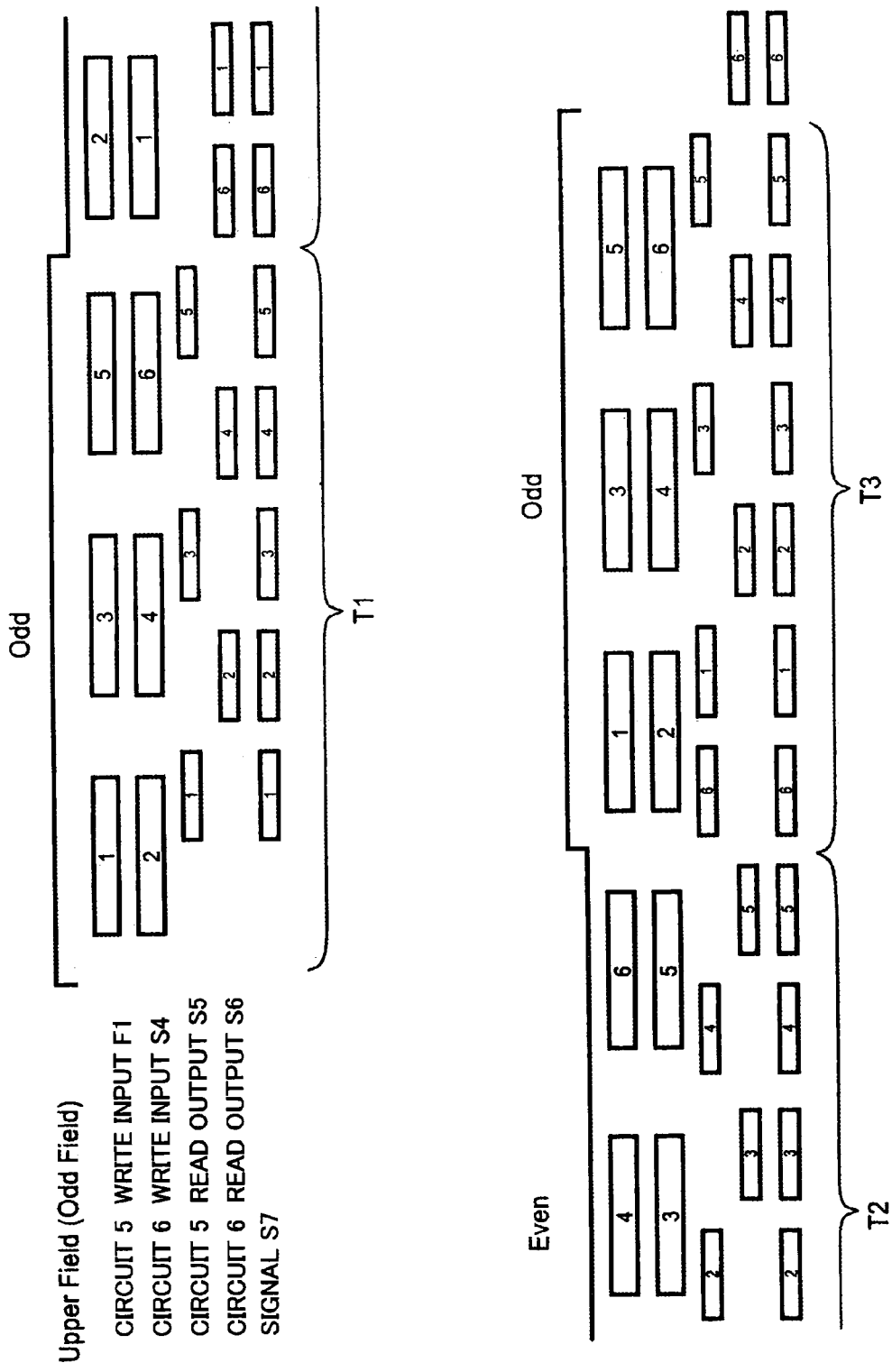
FIG. 6 is a diagram for explaining the processing of a time axis compression circuit and a selector circuit in a latter stage shown in FIG. 4.
Figure 7:
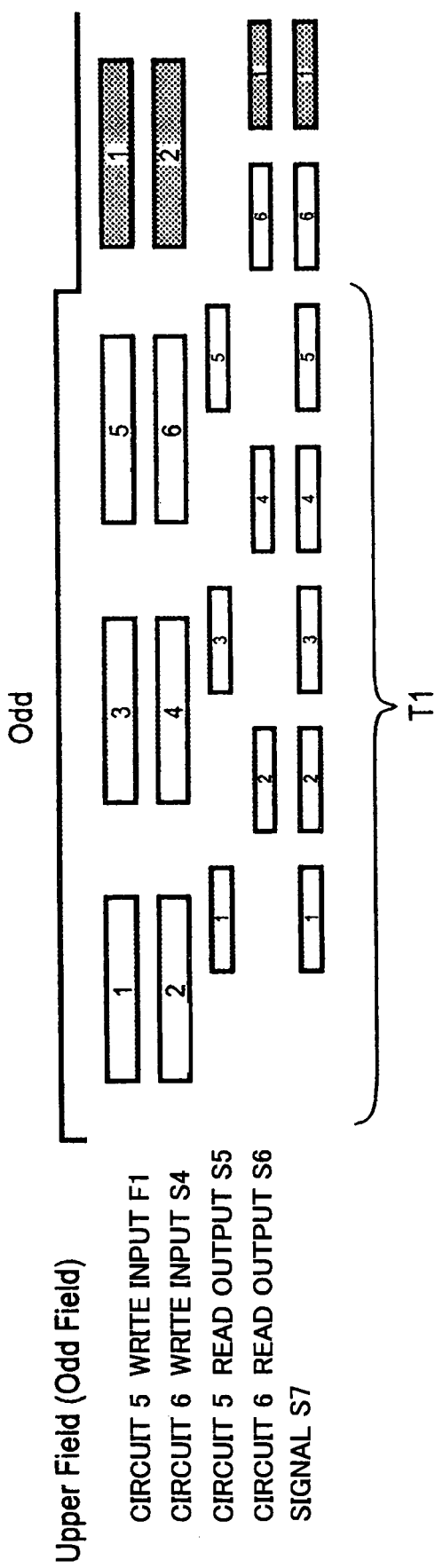
FIG. 7 is a view for explaining the processing of the time axis compression circuit and the selector circuit in the latter stage shown in FIG. 4.
Figure 8:
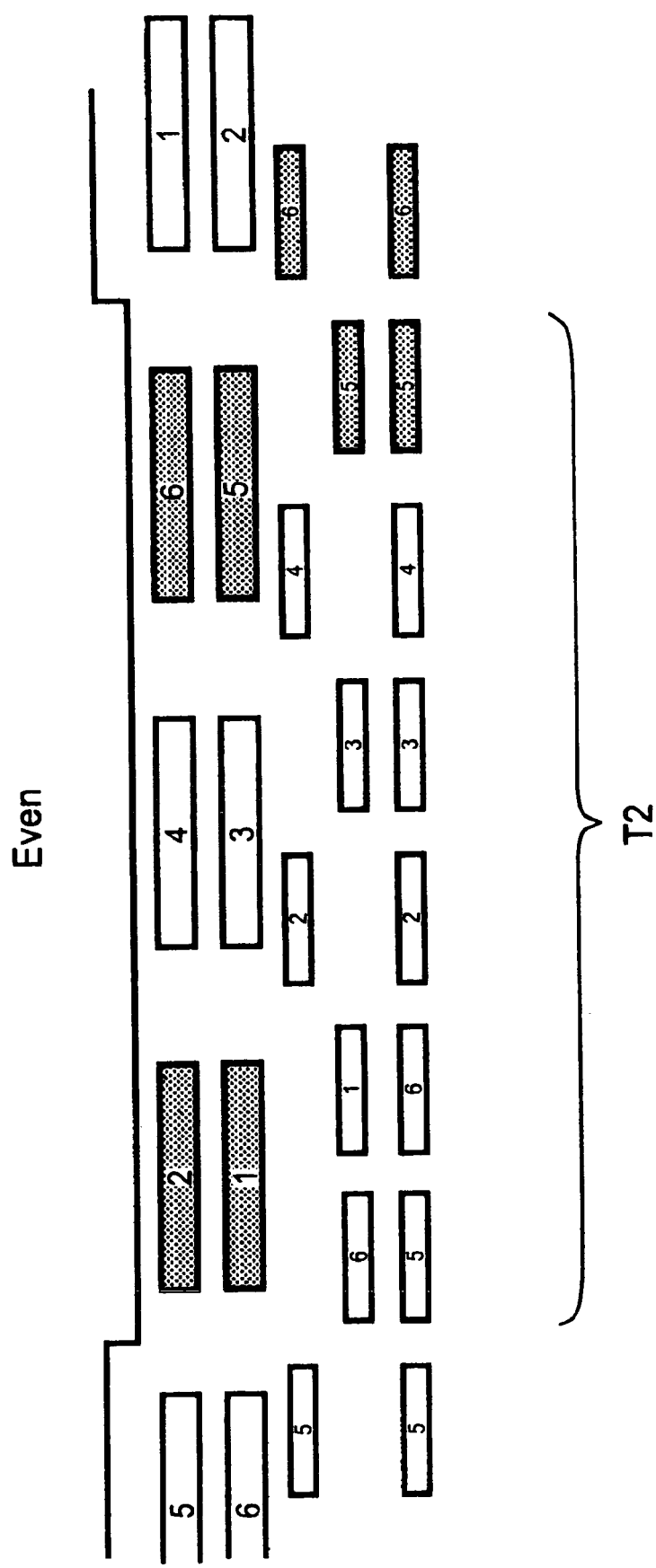
FIG. 8 is a view for explaining the processing of the time axis compression circuit and the selector circuit in the latter stage shown in FIG. 4.
Figure 9:
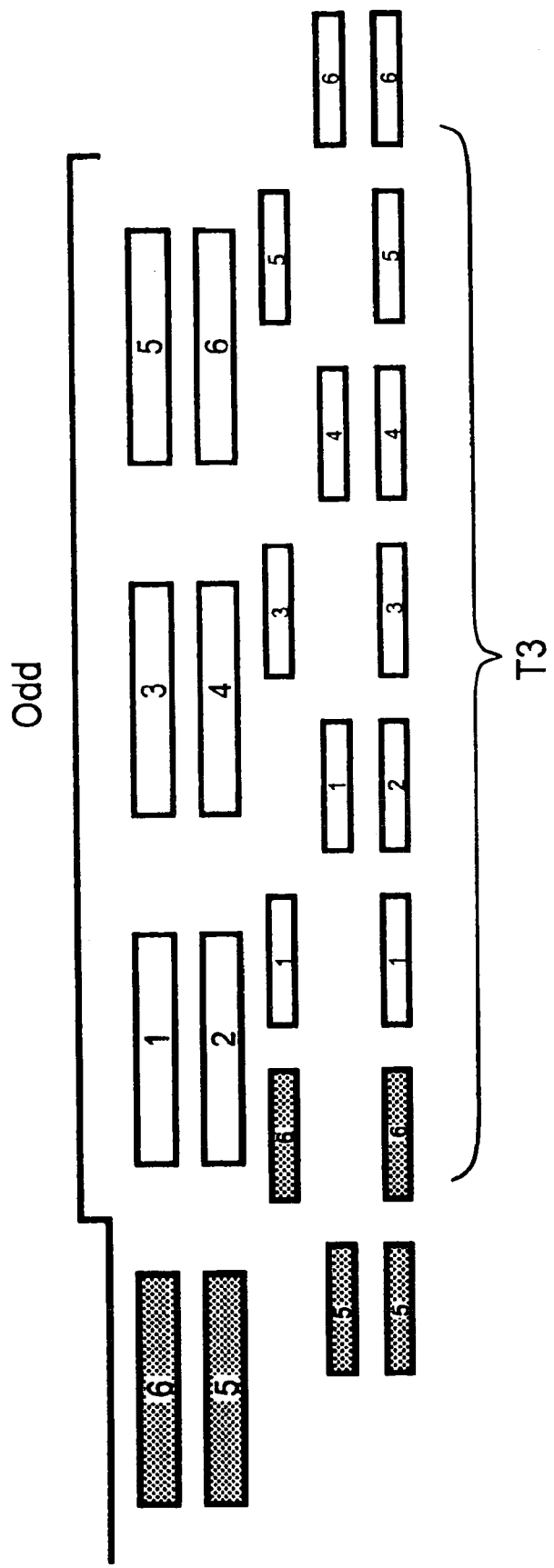
FIG. 9 is a view for explaining the processing of the time axis compression circuit and the selector circuit in the latter stage shown in FIG. 4.

Here, FIG. 7 to FIG. 9 show portions of periods T1 to T3 in FIG. 6 enlarged.

Note that, in these figures, for convenience of the explanation, it is assumed that each field is comprised of six lines.

The time axis compression circuit 5, in the period T1 of the odd field shown in FIG. 6 and FIG. 7, writes the data of the first line of the signal F1 output from the one-field delay circuit 3, compresses it in the time axis, and outputs the result to the selector circuit 7.

The time axis compression circuit 6 compresses the data of the second line supplied from the selector circuit 4 and outputs the result to the selector circuit 7 after the time axis compression circuit 5 outputs the data of the first line.

Below, in the same way, the time axis compression circuit 5 sequentially compresses the data of the third line and the fifth line and outputs the result, and the time axis compression circuit 6 sequentially compresses and outputs the data of the fourth line and the sixth line.

The selector circuit 7 alternately selects the data of lines output from the time axis compression circuit 5 and the time axis compression circuit 6 and outputs them to the D/A conversion circuit 8 in the sequence of the first line, the second line, the third line, the fourth line, the fifth line, and the sixth line. The D/A conversion circuit 8 performs the D/A conversion for the input data and outputs the result.

As shown in FIG. 6 and FIG. 8, in a period T2 of an even field, the time axis compression circuit 5 sequentially compresses the data of the second line, the fourth line, and the sixth line, and outputs the result, and the time axis compression circuit 6 sequentially compresses and outputs the data of the first line, the third line, and the fifth line.

The selector circuit 7 alternately selects the outputs of the time axis compression circuit 5 and the time axis compression circuit 6 also in this case and thereby sequentially selects and outputs the data of the first line to the sixth line.

In a period T3 of the odd field shown in FIG. 6 and FIG. 9, the same processing as that in the period T1 is executed.

Below, an explanation will be given of an example of the operation of the DVD player 30 shown in FIG. 4.

The DVD drive 1 outputs the video signal reproduced from the DVD to the MPEG decoder 2.

Then, the MPEG decoder 2 decodes the video signal input from the DVD drive 1 and outputs the luminance signal F0(Y) of the video signal obtained by the decoding to the one-field delay circuit 21.

Then, the one-field delay circuit 21 generates the luminance signal F1 obtained by delaying the luminance signal F0(Y) shown in FIG. 5A input from the MPEG decoder 2 by an amount of one field and outputs this to the subtractor circuit 22, the one-field delay circuit 3, and the time axis compression circuit 5.

Then, the one-field delay circuit 3 generates the luminance signal F2 obtained by delaying the luminance signal F1 input from the one-field delay circuit 21 by an amount of one field and outputs this to the selector circuit 4.

Further, the subtractor circuit 22, the adder circuit 23, the one-field delay circuit 24, the one-field delay circuit 25, and the comparison circuit 26 perform an operation the same as that of the signal processing apparatus 20 explained in the first embodiment, and the comparison result signal COMP shown in FIG. 5F is output from the comparison circuit 26 to the controller 9.

Then, the controller 9 generates selection signals S9a and S9d and control signals S9b and S9c as mentioned before and outputs them to the selector circuit 4, the time axis compression circuit 5, the time axis compression circuit 6, and the selector circuit 7.

Due to this, the selector circuit 4 outputs the signal S4 shown in FIG. 5H, selected as shown in FIG. 5G by the selection signal S9a between the signal of the field in the luminance signal F0 and the signal of the field in the luminance signal F2, to the time axis compression circuit 6.

Then, the time axis compression circuit 6 outputs the signal S6, obtained by compressing the signal S4 input from the selector circuit 4 in time for each line signal, to the selector circuit 7 based on the control signal S9b.

Further, the time axis compression circuit 5 outputs he signal S5 obtained by compressing the luminance signal F1 in time axis for each line signal to the selector circuit 7 based on the control signal S9c.

Then, the selector circuit 7 generates the progressive signal S7 comprised of the signal of each line selected between the signal S5 and the signal S6 based on the selection signal S9d and outputs this to the D/A conversion circuit 8.

Then, the D/A conversion circuit 8 converts the digital progressive signal S7 to the analog progressive signal S8 and outputs this.

Third Embodiment

The above series of processing can be executed by hardware too, but can also be executed by software. In this case, for example, the DVD player is configured by a personal computer as shown in FIG. 10.

Figure 10:
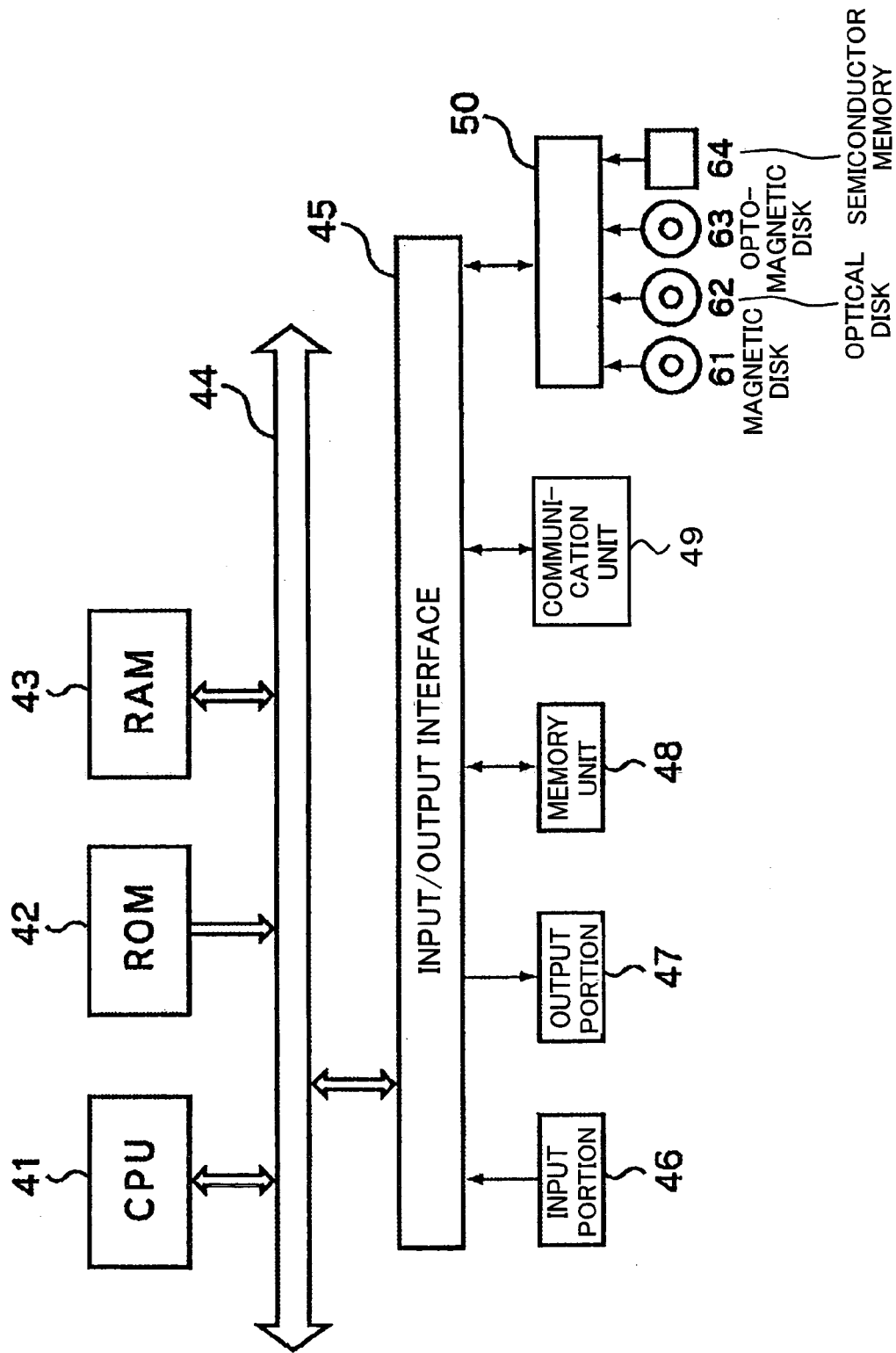
FIG. 10 is a view for explaining a third embodiment of the present invention.

In FIG. 10, a CPU (central processing unit) 41 executes various types of processing according to a program stored in a ROM (read only memory) or a program loaded into a RAM (random access memory) 43 from a memory unit 48. The program corresponds to the program of the present invention and describes for example various routines including the routines shown in FIG. 3.

The RAM 43 appropriately stores also data required when executing various types of processings by the CPU 41.

The CPU 41, the ROM 42, and the RAM 43 are connected to each other via a bus 44. This bus 44 also has an input/output interface 45 connected to it.

The input/output interface 45 has an input portion 46 configured by a keyboard, mouse, etc., a display configured by a CRT, LCD, etc., an output portion configured by a speaker, etc., a memory unit 48 configured by a hard disk etc., and a communication unit 49 configured by a modem, terminal adapter, etc. connected to it. The communication unit 49 performs the communication processing via a network, including the Internet.

The input/output interface 45 has a drive 50 connected to it according to need; a magnetic disk 61 an optical disk 62, an opto-magnetic disk 63, a semiconductor memory 64, etc. is suitably loaded in it, and a computer program read out from these is loaded in the memory unit 48 according to need.

When the above series of processing is executed by software, the program comprising the software is loaded into a computer of dedicated hardware, or for example a general purpose personal computer capable of executing various types of functions by loading various types of programs, from the network or a recording medium.

This recording medium is configured by not only a package medium distributed for providing the program to users separately from the apparatus, comprising a magnetic disk 61 (including floppy disk) recording the program therein, an optical disk 62 (including CD-ROM (compact disk-read only memory), DVD (digital versatile disk)), opto-magnetic disk 63 (including MD (Mini-Disk)), a next generation large capacity optical disk with a finer track pitch than a DVD, called a "Blue-Ray disk" (not illustrated), or a semiconductor memory 64 as shown in FIG. 10, but also a ROM 42 recording the program, a hard disk included in the memory unit 48, etc. provided to the users in a state installed in the apparatus in advance.

Note that, in the present description, the step of writing the program recorded in the recording medium includes not only processing performed in a time sequence along the written sequence, but also processing not necessarily carried out in a time sequence, that is, executed in parallel or individually.

The present invention is not limited to the above embodiments.

For example, in the above embodiments, as the module signals of the fourth to the sixth aspects of the inventions, the signals of fields of luminance signals were exemplified, but the invention is not limited to this. The present invention can also be applied to a case where various module signals other than field signals are used. In this case, as the detected signal, use is made of a signal in which there is a pattern of two coinciding module signals located at two sides sandwiching a predetermined module signal at a predetermined position in a predetermined number of continuous module signals.

As explained above, according to the first to the third aspects of the inventions, a signal processing apparatus capable of being reduced in size when detecting a video signal in which there is a pattern of two coinciding fields located at two sides sandwiching a predetermined field at a predetermined position in a predetermined number of continuous fields, a method of the same, and a program of the same can be provided.

Further, according to the fourth to the sixth aspects of the inventions, a signal processing apparatus capable of being reduced in size when detecting a detected signal comprised of a plurality of module signals wherein there is a pattern of two coinciding module signals located at two sides sandwiching a predetermined module signal at a predetermined position in a predetermined number of continuous module signals can be provided.

INDUSTRIAL CAPABILITY

The present invention can be utilized in for example the case of judging the format of an image signal.

DESCRIPTION OF REFERENCES

1 . . . DVD drive
2 . . . MPEG decoder
3 . . . one-field delay circuit
4 . . . selector circuit
5 . . . time-axis compression circuit
6 . . . time-axis compression circuit
7 . . . selector circuit
8 . . . D/A conversion circuit
9 . . . controller
20 . . . signal processing apparatus
21 . . . one-field delay circuit
22 . . . subtractor circuit
23 . . . adder circuit
24 . . . one-field delay circuit
25 . . . one-field delay circuit
26 . . . comparison circuit
27 . . . judgement circuit

The invention claimed is:

1. A signal processing apparatus comprising:
   a first delaying means for delaying a luminance signal by an amount of one field, said first delaying means including no more than a single delay unit such that said first delaying means outputs a single delayed version of said luminance signal;
   a processing means for generating a difference signal indicating a difference between said luminance signal delayed by an amount of one field by said first delaying means and a not delayed luminance signal for each field;
   an adding means for accumulating difference signal values generated by said processing means on a field-by-field basis to generate a cumulative difference signal;
   a second delaying means for delaying said cumulative difference signal generated by said adding means by an amount of one field; and
   a judging means for comparing the cumulative difference signal generated by said adding means and said cumulative difference signal delayed by an amount of one field by said second delaying means and judging the format of said luminance signal based on the result of said comparison.

2. A signal processing apparatus as set forth in claim 1, wherein said film video signal is a film video signal in which there is a pattern of coinciding luminance signals of two fields located at two sides sandwiching a luminance signal of a predetermined field at a predetermined position in a predetermined number of continuous fields.

3. A signal processing apparatus as set forth in claim 1, further comprising:
   a third delaying means for delaying said luminance signal delayed by an amount of one field by said first delaying means further by the amount of one field and
   a signal generating means for generating a progressive signal by combining line signals in said not delayed luminance signal, said luminance signal delayed by said first delaying means, and said luminance signal delayed by said third delaying means based on the result of judgment of said judging means.

4. A signal processing method comprising:
a first step of delaying a luminance signal by an amount of one field, said delaying being implemented by a single delay unit such that said step of delaying results in a single delayed version of said luminance signal;
a second step of generating a difference signal indicating the difference between said luminance signal delayed by an amount of one field at said first step and a not delayed luminance signal for each field;
a third step of accumulating difference signal values generated at said second step on a field-by-field basis to generate a cumulative difference signal;
a fourth step of delaying said cumulative difference signal generated at said third step by an amount of one field; and
a fifth step of comparing the cumulative difference signal generated at said third step and said cumulative difference signal delayed by an amount of one field at said fourth step and judging the format of said luminance signal based on the result of said comparison.

5. A computer-readable medium storing a computer-readable program executable by a signal processing apparatus for implementing a signal processing method, the method comprising:
a first routine of delaying a luminance signal by an amount of one field, said delaying being implemented by a single delay unit such that said routine of delaying results in a single delayed version of said luminance signal;
a second routine of generating a difference signal indicating the difference between said luminance signal delayed by an amount of one field in said first routine and a not delayed luminance signal for each field;
a third routine of accumulating difference signal values generated in said second routine on a field-by-field basis to generate a cumulative difference signal;
a fourth routine of delaying said cumulative difference signal generated in said third routine by an amount of one field; and
a fifth routine of comparing the cumulative difference signal generated in said third routine and said cumulative difference signal delayed by an amount of one field in said fourth routine and judging the format of said luminance signal based on the result of said comparison.

6. A signal processing apparatus for detecting a detected signal comprised of a plurality of module signals wherein there is a pattern of two coinciding module signals located at two sides sandwiching a predetermined module signal at a predetermined position in a predetermined number of continuous module signals, comprising:
a first delaying means for delaying a signal under detection by an amount of one module signal, said first delaying means including no more than a single delay unit such that said first delaying means outputs a single delayed version of said signal under detection;
a processing means for generating a difference signal indicating the difference between said signal under detection delayed by an amount of one module signal by said delaying means and a not delayed signal under detection in units of said module signal;
an adding means for accumulating difference signal values generated by said processing means on a signal-by-signal basis to generate a cumulative difference signal;
a second delaying means for delaying the cumulative difference signal generated by said adding means by an amount of one module signal; and a detecting means for comparing the cumulative difference signal generated by said adding means and said cumulative difference signal delayed by an amount of one module signal by said second delaying means and detecting whether or not said signal under detection is said detected signal based on the result of the comparison.

7. A signal processing method for detecting a detected signal comprised of a plurality of module signals wherein there is a pattern of two coinciding module signals located at two sides sandwiching a predetermined module signal at a predetermined position in a predetermined number of continuous module signals, comprising:
a first step of delaying a signal under detection by an amount of one module signal, said delaying being implemented by a single delay unit such that said step of delaying results in a single delayed version of said signal under detection;
a second step of generating a difference signal indicating the difference between said signal under detection delayed by an amount of one module signal at said first step and a not delayed signal under detection in units of said module signal;
a third step of accumulating difference signal values generated at said second step on a signal-by-signal basis to generate a cumulative difference signal;
a fourth step of delaying said cumulative difference signal generated at said third step by an amount of one module signal; and
a fifth step of comparing said cumulative difference signal generated at said third step and said cumulative difference signal delayed by an amount of one module signal at said fourth step and detecting whether or not said signal under detection is said detected signal based on the result of the comparison.

8. A computer-readable medium storing a computer-readable program, executable by a signal processing apparatus for performing a signal processing method for detecting a detected signal comprised of a plurality of module signals wherein there is a pattern of two coinciding module signals located on two sides sandwiching a predetermined module signal at a predetermined position in a predetermined number of continuous module signals, the method comprising:
a first routine of delaying a signal under detection by an amount of one module signal, said delaying being implemented by a single delay unit such that said routine of delaying results in a single delayed version of said signal under detection;
a second routine of generating a difference signal indicating the difference between said signal under detection delayed by an amount of one module signal in said first routine and said not delayed signal under detection in units of said module signal;
a third routine of accumulating difference signal values generated at said second routine on a signal-by-signal basis to generate a cumulative difference signal;
a fourth routine of delaying said cumulative difference signal generated in said third routine by an amount of one module signal; and
a fifth routine of comparing said cumulative difference signal generated in said third routine and said cumulative difference signal delayed by an amount of one module signal in said fourth routine and detecting whether or not said signal under detection is said detected signal based on the result of the comparison.

* * * * *